United States Patent [19]

Morishita et al.

[11] Patent Number: 4,471,288
[45] Date of Patent: Sep. 11, 1984

[54] APPARATUS FOR CONTROLLING CHARGING GENERATORS

[75] Inventors: Mitsuharu Morishita; Shinichi Kouge, both of Hyogo, Japan

[73] Assignee: Mitsubishi Denki Kabushiki Kaisha, Tokyo, Japan

[21] Appl. No.: 478,000

[22] Filed: Mar. 23, 1983

[30] Foreign Application Priority Data

Mar. 23, 1982 [JP] Japan .................................. 57-47929
Mar. 23, 1982 [JP] Japan .................................. 57-47930

[51] Int. Cl.$^3$ ............................ H02J 7/14; H02P 9/00
[52] U.S. Cl. ........................................ 322/99; 320/64; 322/28
[58] Field of Search ...................... 322/28, 99; 320/48, 320/64, 68

[56] References Cited

U.S. PATENT DOCUMENTS 3,515,978 6/1970 Williams et al. ...................... 322/28
3,942,097 3/1976 Itoh et al. .............................. 322/28
4,316,134 2/1982 Balan et al. ........................ 320/48 X Primary Examiner—R. J. Hickey
Attorney, Agent, or Firm—Sughrue, Mion, Zinn, Macpeak and Seas

[57] ABSTRACT

An apparatus for controlling a charging generator having armature coils and a field coil includes a rectifier for rectifying an a.c. output induced in the armature coils, the rectifier having a first rectifier output terminal, a second rectifier output terminal, and a ground terminal. The control apparatus has a storage battery chargeable with an output from the first rectifier output terminal, a voltage regulator for turning a current flowing from the second rectifier output terminal to the field coil on and off to control an output voltage from the charging generator to a first preset value, and a charging indicator lamp and a switch device which are connected in series between the storage battery and the second rectifier output terminal through a key-operated switch. A diagnostic device detects the absence of power generation by the charging generator by establishing a second preset voltage value lower than the first preset value, detects an uncontrolled voltage output and disconnection of the first rectifier output terminal by establishing a third preset voltage value higher than the first preset value, and energizes the charging indicator lamp in response to such detected malfunctions.

9 Claims, 4 Drawing Figures

APPARATUS FOR CONTROLLING CHARGING GENERATORS

BACKGROUND OF THE INVENTION

The present invention relates to an apparatus for controlling a charging generator, and more particularly to a charging generator control apparatus having a switch device and a diagnostic device for detecting and indicating malfunctions or failures of the charging generator. The present application is related as to subject matter to U.S. Ser. Nos. 477,802 and 478,126, by the present inventor.

One conventional apparatus for controlling a charging generator is shown in FIG. 1 of the accompanying drawings. A three-phase a.c. generator 1 is installed on an auto (not shown) and is drivable by the engine thereof (not shown). The generator 1 has three-phase star-connected armature coils 101 and a field coil 102. The a.c. output from the generator 1 is rectified by a full-wave rectifier 2 having a first rectifier output terminal 201, a second rectifier output terminal 202, and a ground terminal 203. A voltage regulator 3 serves to control the output voltages from the generator 1 so as to obtain a first preset value by controlling the field current flowing through the field coil 102.

The voltage regulator 3 comprises a surge absorber diode 301 connected across the field coil 102, a pair of Darlington-connected power transistors 302, 303 for turning the current passing through the field coil 102 on and off, a resistor 304 connected to the base of the transistor 303, a control transistor 305 for turning the transistors 302, 303 on and off, a zener diode 306 which is rendered conductive when the potential at the second rectifier output terminal 202 reaches the first preset voltage value, a pair of resistors 307, 308 connected in series and serving as a voltage divider, and an initial exciting resistor 309 connected in parallel to a charging indicator lamp 6 and capable of supplying an initial exciting current to the generator even when the charging indicator lamp 6 is disconnected. A storage battery 4 is connected to the full-wave rectifier 2 and also to the voltage regulator 3 through a key-operated switch 5.

The operation of the control apparatus thus constructed is as follows: When the key-operated switch 5 is closed to start the engine, a base current flows from the storage battery 4 through the key-operated switch 5 and the resistor 304 to the transistors 302, 303 which are rendered conductive. When the transistors 302, 303 are energized, a field current flows from the storage battery 4 through the key-operated switch 5, the charging indicator lamp 6, the resistor 309, the field coil 102, and the transistors 302, 303 to enable the field coil 102 to generate a field magnetomotive force. When the engine is started at this time, the generator 1 is driven and an a.c. output is induced in the armature coils 101 dependent on the RPM of the engine. The induced a.c. output is rectified by the full-wave rectifier 2. If the rectified output is lower than the first preset value, the zener diode 306 remains non-conductive as the potential at the voltage dividing point of the voltage divider resistors 307, 308 is low. Accordingly, field current continues to be supplied to the field coil 102, and the output voltage from the generator 1 increases as the RPM thereof increases. When the output voltage from the generator 1 exceeds the first preset value, the potential at the voltage dividing point of the voltage divider becomes high to the point where the zener diode 306 is rendered conductive, wherein a base current is supplied to the transistor 305 which is then made conductive. Upon energization of the transistor 305, the transistors 302, 303 are de-energized to cut off the current flowing through the field coil 102. The output voltage from the generator 1 now begins to drop. When the output voltage from the generator 1 becomes lower than the first preset value, the zener diode 306 and the transistor 305 are turned off, and the transistors 302, 303 are again turned on to energize the field coil 102. The output voltage of the generator 1 is thus increased once again.

The above cycle of operation will be repeated to control the output voltage of the generator 1 to the first preset value for charging the storage battery 4 at such controlled voltage. At this time, the output voltage at the second rectifier output terminal 202 is substantially equalized with the first preset value. Since there is now almost no potential difference between the second rectifier output terminal 202 and the storage battery 4, the charging indicator lamp 6 is turned off indicating the storage battery 4 has been charged.

In the event of disconnection of a portion of the exciting circuit, however, the charging indicator lamp 6 may remain de-energized even with the generator 1 not being operated. Accordingly, should this happen, the user could not recognize the fact that the storage battery 4 was not being charged, allowing the storage battery 4 to be discharged, and would similarly be unable to identify a disconnection of the first rectifier output terminal 201 or an uncontrolled output voltage.

SUMMARY OF THE INVENTION

It is an object of the present invention to provide a charging generator control apparatus capable of detecting and indicating various malfunctions such as no power generation, an uncontrolled output voltage, and the disconnection of a rectifier output terminal.

Another object of the present invention is to provide a charging generator control apparatus which is relatively simple in circuit arrangement, small in size, and inexpensive to construct.

According to the present invention, a diagnostic device establishes a second preset voltage value smaller than the first preset voltage value to which the output voltage of the charging generator is controlled, for detecting the absence of power generation by the charging generator, and a third preset voltage value larger than the first preset voltage value for detecting an uncontrolled voltage adjustment and disconnection of the first rectifier output terminal of the rectifier coupled to the charging generator. A charging indicator lamp is energized in response to such detected malfunctions.

The above and other objects, features and advantages of the present invention will become more apparent from the following description when taken in conjunction with the accompanying drawings, in which preferred embodiments of the present invention are shown by way of illustrative example.

DETAILED DESCRIPTION OF THE PREFERRED EMBODIMENTS

Figure 1:
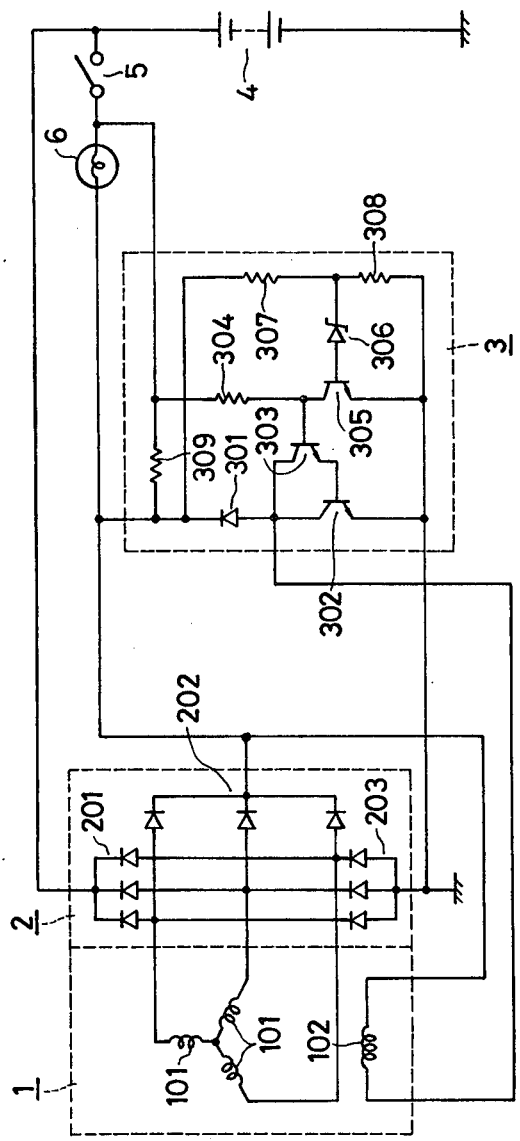
FIG. 1 is a circuit diagram of a conventional control apparatus.
Figure 2:
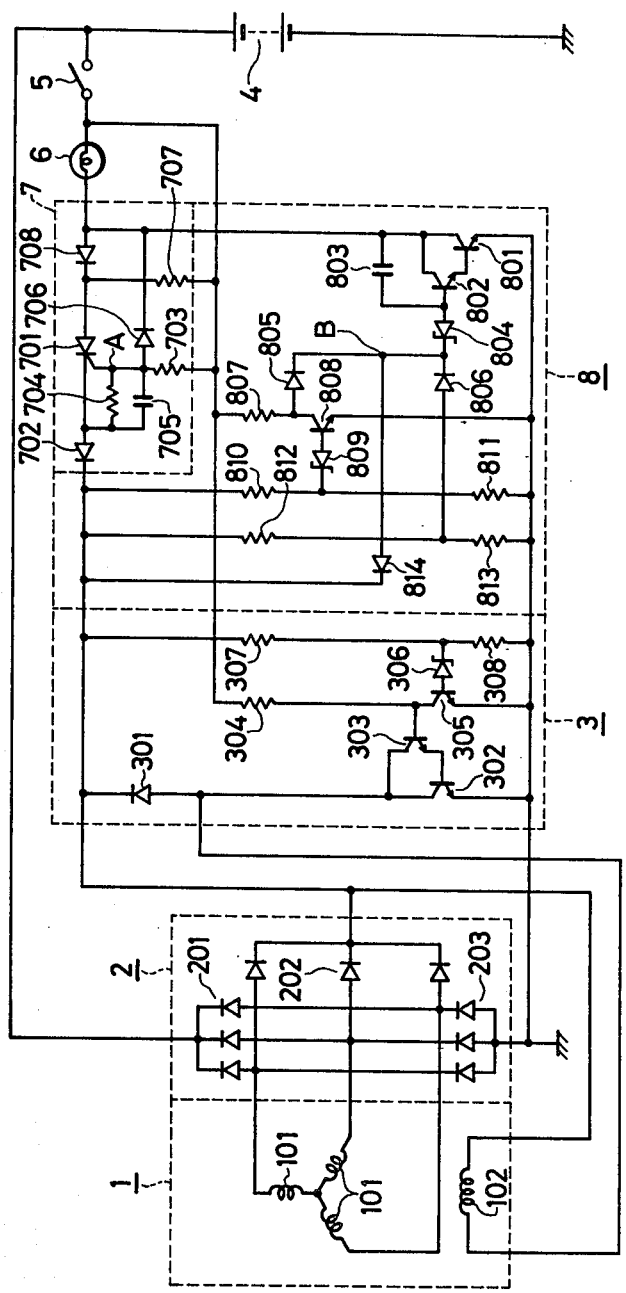
FIG. 2 is a circuit diagram of a control apparatus according to an embodiment of the present inention.

A control apparatus according to an embodiment of the present invention will now be described with reference to FIG. 2. Like or corresponding parts in FIG. 1 are denoted by like or corresponding reference numerals in FIG. 2. A switch device 7 comprises a thyristor 701 which is rendered conductive when the generator 1 is started for passing an initial exciting current through the field coil 102, a diode 702 for blocking off reverse current during operation of the generator 1, a resistor 703 for setting the gate current fed to the thyristor 701, a resistor 704 for preventing the thyristor 701 from being ignited due to noise, a capacitor 705 for delaying ignition of the thyristor 701, a diode 706 for grounding the gate of the thyristor 701 when the charging indicator lamp 6 is energized, a resistor 707 corresponding to the initial exciting resistor 309 employed in the prior apparatus shown in FIG. 1, and a diode 708 for preventing current from flowing through the initial exciting resistor 707 to the charging indicator lamp 6 when the latter is energized by a diagnostic device 8.

The diagnostic device 8 serves to detect the absence of power generation by the charging generator 1 by establishing a second preset voltage value lower than the first preset voltage value, and also detects uncontrolled voltage adjustment by establishing a third preset volage value higher the first preset voltage value, to turn on the charging indicator lamp 6 in response thereto. The diagnostic device 8 also sets up a fourth preset voltage value lower than the second preset voltage value for allowing the diagnostic device 8 to release the detection of the absence of power generation when beginning its operation. This can prevent the starting characteristics of the diagnostic device 8 from becoming poor.

The diagnostic device 8 is composed of Darlington-connected transistors 801, 802 connected between the charging indicator lamp 6 and ground, a capacitor 803 for absorbing ripples, a zener diode 804 having its zener voltage selected so as to bring the potential at a point B into conformity with the fourth preset voltage indicating the starting of the generator 1, and a pair of diodes 805, 806 connected with each other to form an OR gate. The diagnostic device 8 also comprises a resistor 807 connected through the diode 805 and the zener diode 804 to the base of the transistor 802, a transistor 808 which can be turned off when the voltage at the second rectifier output terminal 202 is lower than the second preset voltage indicative of no power generation, to allow a base current to flow through the resistor 807 and the diode 805 to the transistors 801, 802 to energize these transistors, and a zener diode 809 connected in series with the base of the transistor 808 and rendered conductive when the voltage at the second rectifier output terminal 202 is higher than the second preset voltage. A pair of series-connected resistors 810, 811 serve as a voltage divider for the zener diode 809 for dividing the voltage at the second rectifier output terminal 202. Another series-connected pair of resistors 812, 813 serve as a voltage divider for a diode 806 for dividing the voltage at the second rectifier output terminal 202. When the voltage at the second rectifier output terminal 202 is higher than the third preset value representative of an uncontrolled voltage output, the resistors 812, 813 cause a base current to flow through the diode 806 and the zener diode 804 to the transistors 801, 802 to render these transistors conductive. A diode 814 is connected between the second rectifier output terminal 202 and the point B for limiting the voltage at the point B to below the fourth preset value to thereby turn off the transistors 801, 802 when the voltage at the second rectifier output terminal 202 is below the fourth preset value.

The operation of the control apparatus for the above circuit arrangement will now be described.

When the key-operated switch 5 is closed to start the engine, the thyristor 701 is supplied with gate current via the resistor 703 and is rendered conductive. As a result, an initial exciting current flows from the storage battery 4 through the key-operated switch 5, the charging indicator lamp 6, the diode 708 and the initial exciting resistor 707, the thyristor 701, the diode 702, the field coil 102, and the transistors 302, 303. The field coil 102 generates a field magnetomotive force. At the same time, the charging indicator lamp 6 is energized. At this time, since the voltage at the second rectifier output terminal 202 is below the fourth preset value, the voltage at the point B is lower than the fourth preset value through the diode 814, whereupon the transistors 801, 802 are turned off. As a consequence, the current flowing through the charging indicator lamp 6 flows into the transistors 801, 802, thereby preventing the diagnostic device 8 from having poor starting characteristics.

When the engine is started, the generator 1 is operated to generate an output voltage which is controlled by the voltage regulator 3 so as to be kept at the first preset value. At this time, the voltage difference between the storage battery 4 and the second rectifier output terminal 202 falls substantially to zero, and the charging indicator lamp 6 now becomes de-energized. The diode 702 prevents current from flowing from the second rectifier output terminal 202 to the storage battery 4. When the field coil 102 which forms part of the exciting coil, the transistors 302, 303 or the wiring happens to become disconnected, the voltage at the second rectifier output terminal 202 will be lowered below the second preset value, and the zener diode 809 and hence the transistor 808 are turned off. The voltage at the point B at this time is determined substantially by the ratio of the resistor 807 to the resistance between the second rectifier output terminal 202 and ground. By adjusting the resistor 807, the voltage at the point B is selected to be higher than the fourth preset value and lower than the second preset value.

Base current now flows through the resistor 807, the diode 805 and the zener diode 804 to the transistors 801, 802, thus energizing the charging indicator lamp 6. At the same time, the gate voltage for the thyristor 701 is lowered by the diode 706 to prevent the thyristor 701 from being ignited by the gate current. While the generator 1 is not generating electric power, the transistors 801, 802 and the thyristor 701 are made conductive simultaneously. The ignition of the thyristor 701 however is delayed by the capacitor 705.

When the output voltage from the generator 1 is not controlled to the first value due, for examle, to a failure of the voltage regulator 3, and exceeds the third preset value representing the uncontrolled voltage output, the voltage at the voltage dividing point between the resistors 812, 813 is increased to the point where base current flows through the diode 806 and the zener diode 804 to energize the transistors 801, 802. Therefore, the charging indicator lamp 6 is turned on.

Figure 3:
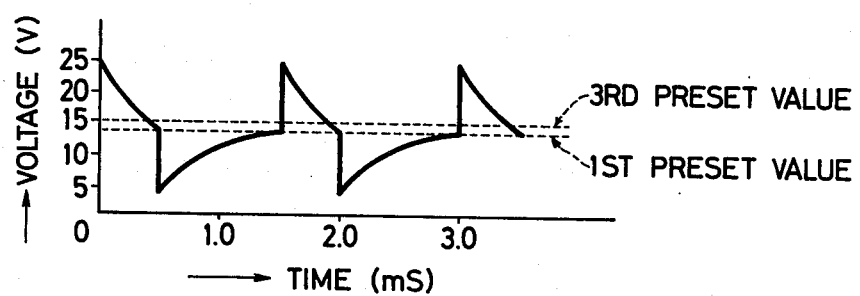
FIG. 3 is a graph showing the waveform of a voltage at first and second rectifier output terminals in the control apparatus shown in FIG. 2.

In a case where the generator 1 operates properly but the storage battery 4 is not charged due to the disconnection of the first rectifier output terminal 201, a voltage having the waveform shown in FIG. 3 appears at the first and second rectifier output terminals 201, 202. During intervals in which the voltage exceeds the third preset value, the transistors 801, 802 are supplied with an intermittent base current via the resistor 812, the diode 806 and the zener diode 804. However, the capacitor 803 causes the transistors 801, 802 to be conductive continuously to enable the charging indicator lamp 6. The diagnostic device 8 may also be composed of a circuit arrangement including comparators.

Figure 4:
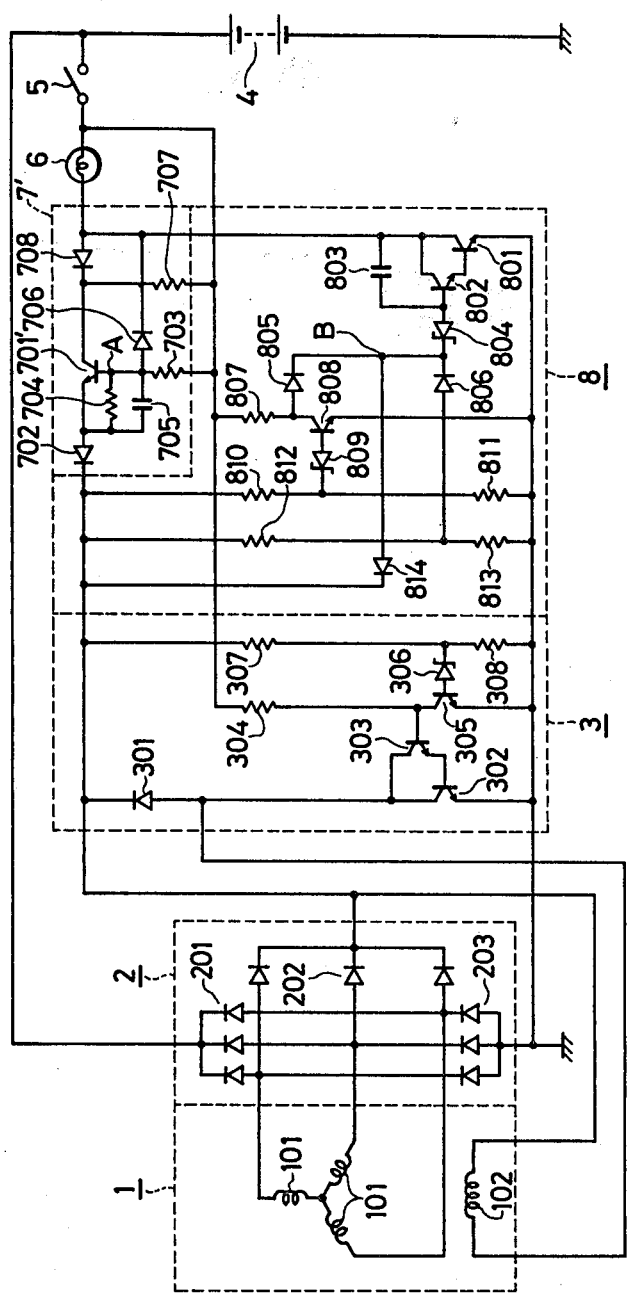
FIG. 4 is a circuit diagram of a control apparatus according to another embodiment of the present invention.

FIG. 4 shows a control apparatus according to another embodiment of the present invention. The control apparatus illustrated in FIG. 4 differs from that of FIG. 2 only in that the switch device 7' has a transistor 701' having a collector connected to the cathode of the diode 708, an emitter connected to the anode of the diode 702, and a base connected to the anode of the diode 706, the resistors 703, 704 and the capacitor 705.

With the arrangement of the present invention, malfunctions such as the absence of power generation, an uncontrolled voltage adjustment, and the disconnection of the first rectifier output terminal 201 that prior arrangements have failed to detect can be detected to turn on the charging indicator lamp 6. More specifically, when no power is generated, due, for example, to the disconnection of the exciting circuit, the switch device 7 is turned off and such a failure can be detected by a voltage at the second rectifier output terminal 202 above the fourth preset value and below the second preset value. An uncontrolled output voltage can be detected by setting up the third voltage value and detecting a voltage above this value. A disconnection of the first rectifier output terminal 201 can be detected on the basis of the output voltage exceeding the third preset voltage at periodic intervals. Accordingly, the storage battery 4 can be prevented from being discharged when no electric power is generated or when the first rectifier output terminal 201 is disconnected. The storage battery 4 can be prevented from being excessively charged and the load can be protected against damage or failure under the uncontrolled condition. By establishing the fourth voltage value, the current flowing through the charging indicator lamp and which is a portion of the initial exciting current ca be prevented from being reduced, without lowering the starting characteristics of the diagnostic device.

Although certain preferred embodiments have been shown and described, it should be understood that many changes and modifications may be made therein without departing from the scope of the appended claims.

What is claimed is:

1. An apparatus for controlling a charging generator having armature coils and a field coil, comprising:
   (a) a rectifier for rectifying an a.c. output induced in the armature coils, said rectifier having a first rectifier output terminal, a second rectifier output terminal, and a ground terminal;
   (b) a storage battery chargeable with an output from said first rectifier output terminal;
   (c) a voltage regulator for turning a current flowing from said second rectifier output terminal to the field coil on and off to control an output voltage from the charging generator to a first preset value;
   (d) a key-operated switch;
   (e) indicator means and switch means connected in series and in the stated order between said storage battery and said second rectifier output terminal through said key-operated switch; and
   (f) a diagnostic device for detecting an absence of power generation by the charging generator by establishing a second preset voltage value lower than said first preset value, for detecting an uncontrolled voltage output and disconnection of said first rectifier output terminal by establishing a third present voltage value higher than said first preset value, for energizing said indicator means via OR means in response to such detections, and for establishing a fourth present voltage value for allowing said diagnostic device to inhibit detection of the absence of power generation during an initial start-up period of said generator.

2. An apparatus according in claim 1, wherein said switch means comprises a thyristor connected in series between said second rectifier output terminal and said indicator means.

3. An apparatus according to claim 2, wherein said diagnostic device includes a pair of Darlington-connected transistors having a collector connected to said indicator means, an emitter connected to said ground terminal, and a base connected to said second rectifier output terminal for energizing said indicator means in response to said detections, said thyristor having a gate terminal, said switch means including a diode having an anode connected to said gate terminal and a cathode connected to said collector.

4. An apparatus according to claim 3, said diagnostic device further including a pair of first and second diodes connected as an OR gate and having cathodes connected with each other at a junction, said first diode having an anode connected between said indicator means and said key-operated switch, said second diode having an anode connected to said second rectifier output terminal, said diagnostic device further including a third diode having an anode coupled to said junction and a cathode joined to said second rectifier output terminal.

5. An apparatus according to claim 1, wherein said switch means comprises a transistor connected in series between said second rectifier output terminal and said indicator means.

6. An apparatus according to claim 5, wherein said diagnostic device includes a pair of Darlington-connected transistors having a collector connected to said indicator means, an emitter connected to said ground terminal, and a base connected to said second rectifier output terminal for energizing said indicator means in response to said detections, said transistor having a base terminal, said switch means including a diode having an anode connected to said base terminal and a cathode connected to said collector.

7. An apparatus according to claim 6, said diagnostic device further including a pair of first and second diodes connected as an OR gate and having cathodes connected with each other at a junction, said first diode having an anode connected between said indicator means and said key-operated switch, said second diode having an anode connected to said second rectifier output terminal, said diagnostic device further including a third diode having an anode coupled to said junction and a cathode joined to said second rectifier output terminal.

8. An apparatus for controlling a charging generator having armature coils and a field coil, comprising:
(a) a rectifier for rectifying an a.c. output induced in the armature coils, said rectifier having a first rectifier output terminal, a second rectifier output terminal, and a ground terminal;
(b) a storage battery chargeable with an output from said first rectifier output terminal;
(c) a voltage regulator for turning a current flowing from said second rectifier output terminal to the field coil on and off to control an output voltage from the charging generator to a first preset value;
(d) a key-operated switch;
(e) indicator means and switch means connected in series between said storage battery and said second rectifier output terminal through said key-operated switch; and
(f) a diagnostic device for detecting an absence of power generation by the charging generator by establishing a second preset voltage value lower than said first preset value, for detecting an uncontrolled voltage output and disconnection of said first rectifier output terminal by establishing a third preset voltage value higher than said first preset value, and for energizing said indicator means in response to such detections, said switch means comprising a thyristor connected in series between said second rectifier output terminal and said indicator means, and wherein said diagnostic device includes a pair of Darlington-connected transistors having a collector connected to said indicator means, an emitter connected to said ground terminal, and a base connected to said second rectifier output terminal for energizing said indicator means in response to said detections, said thyristor having a gate terminal, said switch means including a diode having an anode connected to said gate terminal and a cathode connected to said collector, said diagnostic device further including a pair of first and second diodes connected as an OR gate and having cathodes connected with each other at a junction, said first diode having an anode connected between said indicator means and said key-operated switch, said second diode having an anode connected to said second rectifier output terminal, said diagnostic device further including a third diode having an anode coupled to said junction and a cathode joined to said second rectifier output terminal.

9. An apparatus for controlling a charging generator having armature coils and a field coil, comprising:
(a) a rectifier for rectifying an a.c. output induced in the armature coils, said rectifier having a first rectifier output terminal, a second rectifier output terminal, and a ground terminal;
(b) a storage battery chargeable with an output from said first rectifier output terminal
(c) a voltage regulator for turning a current flowing from said second rectifier output terminal to the field coil on and off to control an output voltage from the charging generator to a first preset value;
(d) a key-operated switch;
(e) indicator means and switch means connected in series between said storage battery and said second rectifier output terminal through said key-operated switch; and
(f) a diagnostic device for detecting an absence of power generation by the charging generator by establishing a second preset voltage value lower than said first preset value, for detecting an uncontrolled voltage output and disconnection of said first rectifier output terminal by establishing a third preset voltage value higher than said first preset value, and for energizing said indicator means in response to such detections,
said switch means comprising a transistor connected in series between said second rectifier output terminal and said indicator means,
said diagnostic device including a pair of Darlington-connected transistors having a collector connected to said indicator means, an emitter connected to said ground terminal, and a base connected to said second rectifier output terminal for energizing said indicator means in response to said detections, said transistor having a base terminal, said switch means including a diode having an anode connected to said base terminal and a cathode connected to said collector, and
said diagnostic device further including a pair of first and second diodes connected as an OR gate and having cathodes connected with each other at a junction, said first diode having an anode connected between said indicator means and said key-operated switch, said second diode having an anode connected to said second rectifier output terminal, said diagnostic device further including a third diode having an anode coupled to said junction and a cathode joined to said second rectifier output terminal.

* * * * *